US011227309B2

(12) United States Patent
Yan et al.

(10) Patent No.: US 11,227,309 B2
(45) Date of Patent: Jan. 18, 2022

(54) METHOD AND SYSTEM FOR OPTIMIZING USER GROUPING FOR ADVERTISEMENT

(71) Applicant: ALIPAY (HANGZHOU) INFORMATION TECHNOLOGY CO., LTD., Zhejiang (CN)

(72) Inventors: Jia Yan, Hangzhou (CN); Zhigang Hua, Hangzhou (CN); Feng Qi, Hangzhou (CN); Yingqi Liu, Hangzhou (CN); Yingping Cao, Hangzhou (CN)

(73) Assignee: ALIPAY (HANGZHOU) INFORMATION TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 17/218,293

(22) Filed: Mar. 31, 2021

(65) Prior Publication Data

US 2021/0241314 A1 Aug. 5, 2021

Related U.S. Application Data

(63) Continuation of application No. PCT/CN2020/084490, filed on Apr. 13, 2020.

(51) Int. Cl.
*G06Q 30/02* (2012.01)
*G06N 20/00* (2019.01)

(52) U.S. Cl.
CPC ......... *G06Q 30/0251* (2013.01); *G06N 20/00* (2019.01)

(58) Field of Classification Search
CPC ............................ G06Q 30/0251; G06N 20/00
(Continued)

(56) References Cited

U.S. PATENT DOCUMENTS 8,271,886 B2  9/2012 Lee et al.
8,359,616 B2  1/2013 Rosenberg et al.
(Continued)

FOREIGN PATENT DOCUMENTS

CN  101520878 A  9/2009
CN  102663519 A  9/2012
(Continued)

OTHER PUBLICATIONS

A New Information-Theoretic Method for Advertisement Conversion Rate Prediction for Large-Scale Sparse Data Based on Deep Learning (Year: 2020).*
(Continued)

*Primary Examiner* — Gautam Ubale

(57) ABSTRACT

Methods, systems, and apparatus, including computer programs encoded on computer storage media, for grouping users are provided. One embodiment of the methods includes: dividing a plurality of users targeted by the an advertisement candidate into a plurality of user buckets, wherein each of the plurality of user buckets is associated with a first conversion score; obtaining a trained prediction model corresponding to the advertisement, wherein the trained prediction model is able to predict a conversion score based at least on the first conversion score associated with a user bucket and a second conversion score associated with a group of user buckets comprising the user bucket; and constructing an optimization model using the trained prediction model, wherein an objective function of the optimization problem is to maximize a total conversion score with a grouping strategy determined by solving the optimization problem.

20 Claims, 7 Drawing Sheets

(58) Field of Classification Search
USPC .................................. 705/14, 319, 14.49
See application file for complete search history.

(56) References Cited

U.S. PATENT DOCUMENTS

| | | | |
|---|---|---|---|
| 8,380,563 B2 | 2/2013 | Datar et al. | |
| 8,645,209 B2 | 2/2014 | Mandyam et al. | |
| 8,655,695 B1 | 2/2014 | Qu et al. | |
| 8,666,812 B1 | 3/2014 | Gandhi | |
| 9,159,034 B2 | 10/2015 | Pinckney et al. | |
| 9,349,099 B2 | 5/2016 | Pinckney et al. | |
| 9,443,199 B2 | 9/2016 | Pinckney et al. | |
| 10,318,534 B2 | 6/2019 | Pinckney et al. | |
| 10,515,394 B2 | 12/2019 | Nicholas et al. | |
| 10,831,839 B1* | 11/2020 | Ogawa | G06N 20/00 |
| 2013/0179252 A1* | 7/2013 | Dong | G06Q 30/02 705/14.43 |
| 2014/0156402 A1 | 6/2014 | Jha et al. | |
| 2014/0214537 A1 | 7/2014 | Yoo et al. | |
| 2015/0012363 A1 | 1/2015 | Grant et al. | |
| 2016/0292746 A1* | 10/2016 | Kang | G06Q 30/0275 |
| 2017/0004540 A1 | 1/2017 | Mihalik et al. | |
| 2017/0061502 A1* | 3/2017 | Zhang | G06Q 30/0275 |
| 2017/0193403 A1* | 7/2017 | Iscoe | G06F 16/958 |
| 2017/0221090 A1* | 8/2017 | Li | G06Q 30/0244 |
| 2017/0330253 A1 | 11/2017 | Tonnison et al. | |
| 2018/0012166 A1* | 1/2018 | Devadas | G06Q 10/06315 |
| 2018/0068350 A1 | 3/2018 | Grosso | |
| 2019/0018897 A1* | 1/2019 | Iannaccone | G06Q 30/0251 |
| 2019/0080367 A1* | 3/2019 | Agarwal | G06Q 30/0261 |
| 2019/0172089 A1* | 6/2019 | Tang | G06Q 30/0242 |
| 2019/0266645 A1 | 8/2019 | Lajoie | |
| 2020/0175415 A1* | 6/2020 | Zou | G06N 7/005 |
| 2020/0344243 A1* | 10/2020 | Brannon | H04L 63/102 |
| 2021/0084350 A1* | 3/2021 | Chandra | H04N 21/8541 |

FOREIGN PATENT DOCUMENTS

| | | | | |
|---|---|---|---|---|
| CN | 105160548 A | | 12/2015 | |
| CN | 108197845 A | * | 6/2018 | |
| CN | 109034896 A | | 12/2018 | |
| CN | 109167816 A | | 1/2019 | |
| CN | 110443647 A | | 11/2019 | |
| CN | 111091400 A | * | 5/2020 | |
| WO | WO-2020143849 A2 | * | 7/2020 | G06N 20/00 |

OTHER PUBLICATIONS

An Enhanced Ad Event-Prediction Method Based on Feature Engineering (Year: 2019).*
How To Calculate Conversion Rate the Conversion Rate Formula (Year: 2019).*
Reacting to Variations in Product Demand: An Application for Conversion Rate (CR) Prediction in Sponsored Search (Year: 2018).*
Machine Learning to Predict Advertisement Targeting Solutions (Year: 2017).*
Written Opinion and International Search Report for PCT Application No. PCT/CN2020/084490 dated Jan. 19, 2021.
Guo Xinyu et.al, "An Optimization Strategy Based on Impression and Click-Through Rate for User Segments", Journal of Computer Research and Development, vol. 50, No. S1, Dec. 31, 2013.

* cited by examiner

METHOD AND SYSTEM FOR OPTIMIZING USER GROUPING FOR ADVERTISEMENT

CROSS REFERENCE TO RELATED APPLICATIONS

The application is a continuation application of International Patent Application No. PCT/CN2020/084490, filed on Apr. 13, 2020. The entire content of the above referenced application is incorporated herein by reference.

TECHNICAL FIELD

The disclosure relates generally to systems and methods for optimizing online advertisement delivery, in particular for optimizing user grouping for online advertisement delivery.

BACKGROUND

Online advertising is a form of marketing and advertising that uses the internet to deliver promotional marketing messages (e.g., advertisement, promotion, coupon) to users. Usually one advertisement may be directed towards users with certain traits, based on the product and/or the person the advertiser is promoting.

When determining which advertisements to be displayed to a user, the host (e.g., a search engine, a website) may first determine the advertisement candidates that target this user, and then select one or more of them to display to the user (e.g., depending on the number of available advertisement slots).

Traditionally, the users targeted by an advertisement are divided into a few groups according to the users' conversion rates. Usually the users are ordered by their conversion rates in a descending order, and only the users on the top of the list may have a chance to be selected to receive the advertisement. Although displaying the advertisement only to the few users with high conversion rates may provide short-term benefit, it limits the user base (e.g., number of users receiving the advertisement) and may lead to a comprised overall user exposures. It is thus desirable to optimize the consumer grouping method for advertisement, in order to improve the fairness and overall effectiveness for online advertising.

SUMMARY

Various embodiments of the present specification may include systems, methods, and non-transitory computer readable media for personalizing advertisements.

According to one aspect, the method for grouping users may comprise: dividing a plurality of users targeted by the an advertisement candidate into a plurality of user buckets, wherein each of the plurality of user buckets is associated with a first conversion score; obtaining a trained prediction model corresponding to the advertisement, wherein the trained prediction model is able to predict a conversion score based at least on the first conversion score associated with a user bucket and a second conversion score associated with a group of user buckets comprising the user bucket; constructing an optimization model using the trained prediction model, wherein an objective function of the optimization problem is to maximize a total conversion score with a grouping strategy represented by a plurality of decision variables; solving the optimization problem to determine values of the plurality of decision variables; and assigning the plurality of user buckets to one or more user groups for the advertisement candidate according to the grouping strategy.

In some embodiments, the determining a score for delivering the each advertisement candidate may comprise: determining the score based at least on the first conversion score associated with one of the plurality of user buckets comprising the user, and the second conversion score associated with one of the one or more user groups comprising the one user bucket.

In some embodiments, the identifying one or more of the plurality of advertisements may comprise: identifying the one or more advertisement candidates with the highest scores.

In some embodiments, each of the plurality of users may be associated with a third conversion score corresponding to the advertisement; each of the plurality of user buckets may comprise one or more of the plurality of users; and the first conversion score associated with the each of the plurality of user buckets may comprise an average of one or more third conversion scores associated with the one or more of the plurality of users in the each of the plurality of user buckets.

In some embodiments, the third conversion score may be a click through rate in response to the advertisement.

In some embodiments, the second conversion score associated with a group of one or more of the plurality of user buckets may be determined based at least on the first conversion scores associated with the one or more of the plurality of user buckets in the group and a number of users in each of the one or more of the plurality of user buckets.

In some embodiments, the prediction model may be a tensor flow model that fits historical data of exposure rate to estimate a plurality of parameters of a logistic function.

In some embodiments, the solution to the optimization model may comprise a vector of decision variables, each representing whether one of the plurality of user buckets is assigned to one of the one or more user groups.

In some embodiments, the values of the plurality of decision variables may be binary values; and each of the plurality of decision variables may represent whether one of the plurality of user buckets is assigned to one of the one or more user groups.

In some embodiments, a quantity of the one or more user groups may be a configurable value associated with the advertisement.

In some embodiments, the optimization model may comprise a constraint that one user bucket is assigned to one and only one user group.

In some embodiments, the objective function of the optimization problem is max $\Sigma_{j=1}^{J} \Sigma_{i=1}^{I} f(s_i, t_j) * n_i * x_{ij}$; where J is the quantity of the one or more user groups; where j corresponds to $j_{th}$ user group; where I is a number of the plurality of user buckets; where i corresponds to $i_{th}$ user bucket; where $f(s_i, t_j)$ corresponds to the trained prediction model; where $s_i$ corresponds to the first conversion score of the $i_{th}$ user bucket; where $t_j$ corresponds to the second conversion score of the $j_{th}$ user group; where $n_i$ corresponds to a number of users in the $i_{th}$ user bucket; and where $x_{ij}$ corresponds to a decision variable indicating whether the $i_{th}$ user bucket is assigned to the $j_{th}$ user group.

According to other embodiments, a system for grouping users comprises one or more processors and one or more computer-readable memories coupled to the one or more processors and having instructions stored thereon that are executable by the one or more processors to perform the method of any of the preceding embodiments.

According to yet other embodiments, a non-transitory computer-readable storage medium is configured with instructions executable by one or more processors to cause the one or more processors to perform the method of any of the preceding embodiments.

According to still other embodiments, an apparatus for grouping users comprises a plurality of modules for performing the method of any of the preceding embodiments.

According to another aspect, a system for grouping users may comprise a computer system comprising a processor and a non-transitory computer-readable storage medium storing instructions executable by the processor to cause the computer system to perform operations comprising: dividing a plurality of users targeted by the an advertisement candidate into a plurality of user buckets, wherein each of the plurality of user buckets is associated with a first conversion score; obtaining a trained prediction model corresponding to the advertisement, wherein the trained prediction model is able to predict a conversion score based at least on the first conversion score associated with a user bucket and a second conversion score associated with a group of user buckets comprising the user bucket; constructing an optimization model using the trained prediction model, wherein an objective function of the optimization problem is to maximize a total conversion score with a grouping strategy represented by a plurality of decision variables; solving the optimization problem to determine values of the plurality of decision variables; and assigning the plurality of user buckets to one or more user groups for the advertisement candidate according to the grouping strategy.

According to yet another aspect, a non-transitory computer-readable storage medium for grouping users may be configured with instructions executable by one or more processors to cause the one or more processors to perform operations comprising: dividing a plurality of users targeted by the an advertisement candidate into a plurality of user buckets, wherein each of the plurality of user buckets is associated with a first conversion score; obtaining a trained prediction model corresponding to the advertisement, wherein the trained prediction model is able to predict a conversion score based at least on the first conversion score associated with a user bucket and a second conversion score associated with a group of user buckets comprising the user bucket; constructing an optimization model using the trained prediction model, wherein an objective function of the optimization problem is to maximize a total conversion score with a grouping strategy represented by a plurality of decision variables; solving the optimization problem to determine values of the plurality of decision variables; and assigning the plurality of user buckets to one or more user groups for the advertisement candidate according to the grouping strategy.

According to yet another aspect, an apparatus for grouping users may comprise a first grouping module, a training module, an optimization modeling module, an optimization solving module, and a second grouping module. In some embodiments, the first grouping module may divide a plurality of users targeted by the an advertisement candidate into a plurality of user buckets, wherein each of the plurality of user buckets is associated with a first conversion score; the training module may obtain a trained prediction model corresponding to the advertisement, wherein the trained prediction model is able to predict a conversion score based at least on the first conversion score associated with a user bucket and a second conversion score associated with a group of user buckets comprising the user bucket; the optimization modeling module may construct an optimization model using the trained prediction model, wherein an objective function of the optimization problem is to maximize a total conversion score with a grouping strategy represented by a plurality of decision variables; the optimization solving module may solve the optimization problem to determine values of the plurality of decision variables; and the second grouping module may assign the plurality of user buckets to one or more user groups for the advertisement candidate according to the grouping strategy Embodiments disclosed in the specification have one or more technical effects. In one embodiment, the disclosed methods and systems divide the plurality of users (e.g., in hundreds of millions) targeted by an advertisement or an advertisement group (e.g., one or more advertisements that share similar target users for a common theme) into a large number of buckets (e.g., in tens or hundreds of thousands). In comparison to the existing solutions that dividing the users into a few groups (e.g., usually less than one hundred), the disclosed methods and systems provide a finer-grained and accurate user management. In another embodiment, the disclosed methods and systems train a machine learning model to learn exposure curve with personalized conversion scores for an advertisement. In one embodiment, the model is trained by fitting the advertisement's historical exposure rates into a tensor-flow model to estimate parameters of a logistic function. After being trained, the model may predict a conversion score of delivering the advertisement to a user. In particular, the model considers not only the user's personal click-through rate (CTR) that represents the "quality" of the user, but also the average CTR of the user group comprising the user that represents to some extent the "quality" of the advertisement for the group of users. Thus, the predictions made by the model are accurate and with less bias. In yet another embodiment, the disclosed methods and systems determine the user grouping strategy based on a solution to a constraint optimization problem. The decision variables of the optimization problem suggest which users should be grouped together, and the objective function of the optimization problem is to maximize a global conversion score. Grouping the users according to the solution to this optimization problem avoids the unnecessary bias and unfairness in the existing solutions, and may achieve the optimal conversion result from a global perspective.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

Figure 1:
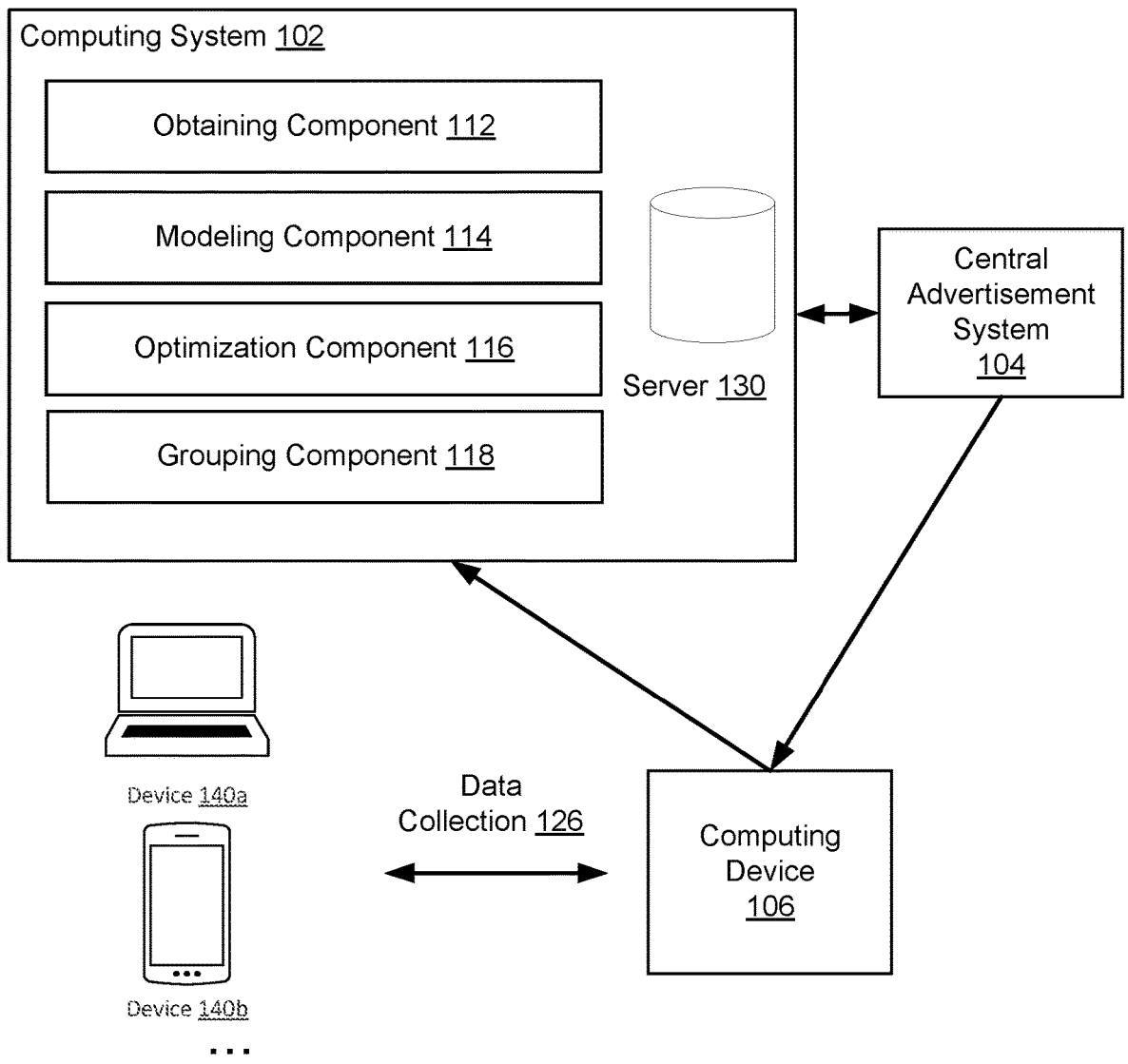
FIG. 1 illustrates an example environment for optimizing user grouping for advertisement may be applied, in accordance with various embodiments.

The technologies disclosed herein may optimize the accuracy and overall efficiency of online advertising. In some embodiments, a page (e.g., a webpage, a first page of an application, a message) may have a few advertisement slots (e.g., banner) to display promotions, advertisements, coupons, etc. to a user. While the number of advertisement slots is highly limited (e.g., three or less, for good user experience), the number of advertisement candidates is usually in millions. In order to maximize the overall exposure rate, the platform hosting the page (e.g., a search engine, an ecommerce platform, a mobile application) may selectively display certain advertisements to a user. These selected advertisements, when delivered to the user, should produce the optimal conversion rates. In this specification, an advertisement or ad may refer to a single advertisement, or an advertisement group (e.g., one or more advertisements that share similar target users for a common theme). A conversion rate may refer to a probability of that a user clicks an ad, or a probability that a user clicks an ad and then completes a purchase/conversion. In this specification, conversion rate and click through rate (CTR) may be used interchangeably to represent a family of advertising metrics.

In order to predict the conversion rate (e.g., in a form of conversion score) of delivering an advertisement to one specific user, a plurality of factors may be considered. In one embodiment, the factors may include the "quality" of the user itself (e.g., represented by a personal conversion rate corresponding to the advertisement), which may be obtained from the advertiser or learned from historical data. In one embodiment, the factors may further include the "quality" of the advertisement itself corresponding to the specific user, which may be represented by the average conversion rate of a group of the targeted users including the specific user. As a result, the fairness and efficiency of the strategy for grouping the targeted users may directly impact the selection of the advertisements for users.

In some embodiments, grouping users with high personal conversion rates and only delivering the corresponding ad to the group may achieve the highest conversion rate. However, this user grouping approach ignores the size of user base, which may result in compromised overall user experience (e.g., an advertiser may complain that its ad group is only being delivered to a small group of targeted users, even though they have high conversion rates). In some embodiments, a more balanced grouping method may be designed to quantify the curve of actual exposure rate against the personalized conversion rates of user conversion behaviors. In some embodiments, the grouping method may be formulated as a non-linear integer programming and being solved by open-source solvers (such as Bonmin).

In this specification, conversion rate and conversion score are used interchangeably; ad and advertisement are used interchangeably.

FIG. 1 illustrates an example environment for optimizing user grouping for advertisement may be applied, in accordance with various embodiments. The components of the system 100 presented below are intended to be illustrative. Depending on the implementation, the system 100 may include additional, fewer, or alternative components.

In some embodiments, the system 100 may include a computing system 102, a central advertisement system 104, and a computing device 106. It may be appreciated that although one computing device is shown in FIG. 1, any number of computing devices may be included in the system 100. The computing system 102 may be implemented in one or more networks (e.g., enterprise networks), one or more endpoints, one or more servers (e.g., server 130), or one or more clouds. The server 130 may include hardware or software which manages access to a centralized resource or service in a network. A cloud may include a cluster of servers and other devices which are distributed across a network.

The computing system 102 may be understood as an online marketing platform, such as a search engine, a webpage, a mobile application. The central advertisement system 104 may refer to an online decision-making system where the final decisions on which ads to be delivered to a user are made. Various data may be exchanged between the central advertisement system and the computing system 102 (e.g., the computing system 102 may send user grouping results to the central advertisement system 104, and/or collecting historical ads delivery decisions made by the central advertisement system 104). The server 130 within the computing system 102 may provide storage and/or computing capacity for the computing system 102. In some embodiments, the computing device 106 may be associated with one or more advertisers (e.g., entities generating advertisement candidates for the computing system to be displayed to users). In some embodiments, the computing device 106 associated with the advertisers may collect various data from its targeted users. As shown in FIG. 1, the computing device 106 may perform data collection 126 from the device 140a and the device 140b that associated with one or more targeted users. In some embodiments, the data collection 126 may refer to a process where the advertisers send advertisement candidates to the users to collect response data. The collected response data may then be used to determine each user's "quality" (e.g., conversion rate, click-through rate) responsive to the advertisement candidates. In some embodiments, the data collection 126 by the computing device 106 associated with the advertisers may be delegated to the computing system 102. For example, after receiving the advertisement candidates from the advertisers through the computing device 106, the online marking platform (e.g., through the computing system 102) may conduct the data collection 126 to learn the targeted users' response curves.

The computing system 102 may include an obtaining component 112, a modeling component 114, an optimization component 116, and a grouping component 118. The computing system 102 may include other components. The computing system 102 may include one or more processors (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) and one or more memories (e.g., permanent memory, temporary memory, non-transitory computer-readable storage medium). The one or more memories may be configured with instructions executable by the one or more processors. The processor(s) may be configured to perform various operations by interpreting machine-readable instructions stored in the memory. The computing system 102 may be installed with appropriate software (e.g., platform program, etc.) and/or hardware (e.g., wires, wireless connections, etc.) to access other devices of the system 100.

In some embodiments, the computing device 106 may be implemented on or as various devices such as a mobile phone, tablet, server, desktop computer, laptop computer, etc. The computing system 102 may communicate with the computing device 106, and other computing devices. Communication between devices may occur over the internet, through a local network (e.g., LAN), through direct communication (e.g., BLUETOOTH™, radio frequency, infrared), etc.

In some embodiments, the system 100 may include a user grouping platform. For example, the computer system 102 and/or other computing devices may implement the user grouping platform. The user grouping platform may build or train a model to predict conversion rate of delivering one advertisement (e.g., or an advertisement group) to a user, and effectuate its applications. In some embodiments, the model to predict conversion rate may be built by the online marking platform or by the advertisers through historical data. The user grouping platform may also solve an optimization problem for one advertisement to determine the optimal user grouping strategy. Once the users are grouped, the user grouping results may be delivered to the central advertisement system 104. In response to a request to deliver one or more ads to a user (e.g., when the user opens a web page or a mobile application, or when broadcasting ads), the central advertisement system 104 may, based on the user grouping results, determine which ads to be delivered to the user.

In some embodiments, the obtaining component 112 in the computing system 102 may be configured to collect various data. The data may include information of users targeted by the advertisements, historical ads delivered to users by the central advertisement system 104 (e.g., actual exposures), individual conversion rates of the users in response to the advertisement, a number of groups to group the targeted users (e.g., this number may be configured by the advertiser, the computing system 102, or another suitable party), suitable other historical data, or any combination thereof. The computing device 106 and/or the computing system 102 may have obtained or stored such data in advance, in real time, or periodically. For example, an ad may be first delivered to a million of users (e.g., ads delivery decisions), and the corresponding responses along with the information of the users may be collected by the obtaining component 112. The responses may include data entries with various features, such as personal conversion score (e.g., personal conversion rate), ad identifier, click (yes or no), time, ad position (e.g., banner position), website identifier, website domain, website category, application identifier, application domain, application category, device identifier, device IP, device model, device type, device connection type, another suitable feature, or any combination thereof.

In some embodiments, based on the obtained data, the modeling component 114 of the computing system 102 may build or train a conversion rate prediction model responsive to one advertisement (or an ad group). One or more advertisements may share one conversion rate prediction model. The model may be deployed in a remote server, cloud, client-side device, etc. In some embodiments, the modeling component 114 may select a machine learning algorithm to fit the obtained data, such as a logistic function shown in formula (1).

$$f(v_1, v_2) = \frac{1}{1 + e^{w_0 + w_1 v_1 + w_2 v_2}} \quad (1)$$

The logistic function may have two input features $v_1$ and $v_2$, where $v_1$ may represent a personalized conversion score, and $v_2$ may represent an average conversion score of all users in one ad group. The logistic function may also have three parameters $w_0$, $w_1$, $w_2$ to be learned by fitting the obtained (historical) data. The e in formula (1) represents a natural logarithm base (also known as Euler's number). In some embodiments, the logistic function may be trained by fitting the advertisement's historical exposure rates into a tensor-flow model to estimate parameters of the logistic function.

In some embodiments, the optimization component 116 of the computing system 102 may formulate an optimization problem in order to determine the optimal grouping strategy. In some embodiments, the grouping strategy may group the target users at individual level (e.g., the finest-grained level). In some embodiments, in order to reduce the noise of the data at individual level, the target users may first be assigned into small buckets of users, and each bucket is treated as the smallest unit for the optimization problem. For example, ten millions of target users may be first divided into ten thousands buckets according to their personal conversion rate (e.g., actual individual conversion rate), with the first bucket comprising the users with personal conversion rates between 100% and 99.99%, the second bucket comprising the users with personal conversion rates between 99.99% and 99.98%, and so on. In the following discussion, one bucket of users may be treated as a user. In some embodiments, each individual user may be considered as a bucket, and thus the target users can be considered as being divided into buckets, each having one user. Such embodiments should be considered covered by the inventions described herein.

In some embodiments, the objective function of the optimization problem may be to maximize an overall exposure rate (e.g., exposure to unique visitor/viewer in the context of advertising) by using the aforementioned conversion rate prediction model. For example, the optimization problem may be represented as formula (2) and the corresponding constraint may be represented as formula (3).

$$\max \Sigma_{j=1}^{J} \Sigma_{i=1}^{I} f(s_i, t_j) * n_i * x_{ij} \quad (2)$$

$$\text{subject to:} \Sigma_{j=1}^{J} x_{ij} = 1, \forall i \quad (3)$$

where I may represent the number of buckets of users, and i may represent the $i_{th}$ bucket; J may represent the number of groups to be created (e.g., a number that may be configured by the advertiser or the platform), and j may represent the $j_{th}$ group; n may represent the number of users in the $i_{th}$ bucket; $f(s_i, t_j)$ may represent the conversion rate prediction model shown in formula (1), and $s_i$ may represent the conversion score of the $i_{th}$ bucket of users, and $t_j$ may represent the average conversion rate of the $j_{th}$ group given a certain assignment $$\left(\text{e.g., } t_j = \frac{\sum_{i=1}^{I} s_i n_i x_{ij}}{\sum_{i=1}^{I} n_i x_{ij}}\right).$$

In some embodiments, the decision variable $x_{ij}$ may have a binary value representing whether the $i_{th}$ bucket of users should be grouped into the $j_{th}$ group. In other embodiments, the decision variable $x_{ij}$ may have continuous values. In some embodiments, if the logistic function in formula (1) is being used in the optimization problem in formula (2), the objective function is a non-linear integer programming that may be solved by various open-source solvers (such as Bonmin) to obtain the $x_{ij}$ vector (or matrix). The constraint in formula (3) may indicate that one bucket of users may be grouped into one and only one group.

In some embodiments, the grouping component 118 of the computing system 102 may determine the grouping strategy according to the solution the optimization problem shown in formula (2). It may be appreciated that this grouping strategy may apply to a specific advertisement (or an ad group sharing similarities) that the historical data is associated with. In some embodiments, the computing system 102 may perform the process (e.g., obtaining data, building a conversion rate prediction model, solving an optimization problem) for each of the advertisements (or each ad group).

Figure 2:
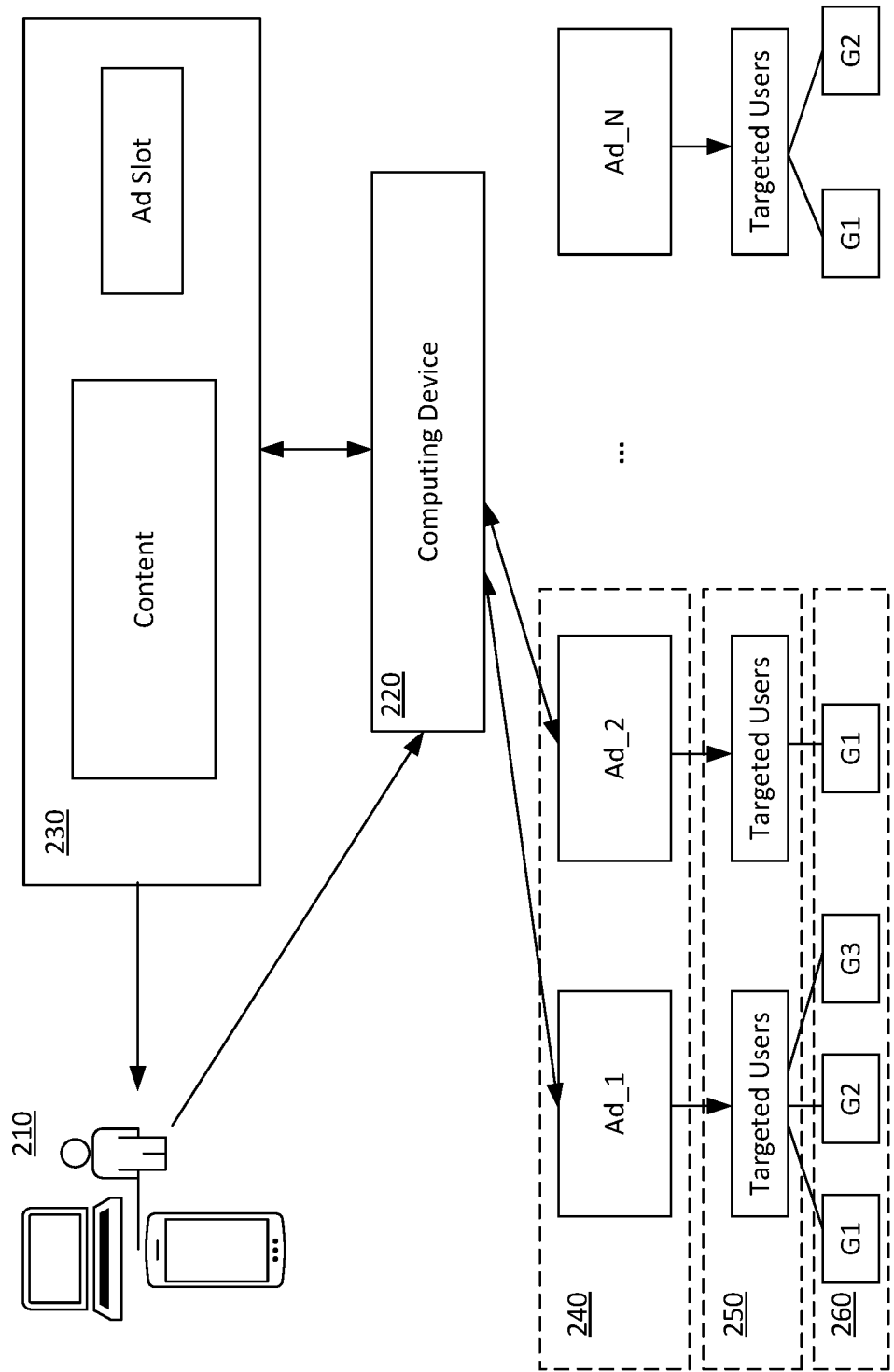
FIG. 2 illustrates an example flow for delivering advertisements to a user, in accordance with various embodiments.

FIG. 2 illustrates an example flow for delivering advertisements to a user, in accordance with various embodiments. Determining which ads to be delivered may occur after the users are grouped, either by the existing user grouping solutions or the user grouping methods disclosed herein. In some embodiments, the flow may start with a user visiting a webpage (or another suitable online page) 230 through a computing device 210 (e.g., a computer, a smart phone), where a limited number of ad slots are available on the webpage to display ads or promotions. As shown in FIG. 2, the webpage 230 has one ad slot next to the webpage content. Here, the user 210 may refer to an individual person, an entity, a computing device, or another suitable user. The computing device 220 may first determine one or more ads that target the user 210 (e.g., an advertiser may specify the users that its ad targets). As shown in FIG. 2, among the ads Ad_1, Ad_2, . . . , and Ad_N, Ad_1 and Ad_2 are determined as targeting the user 210. Ad_1 and Ad_2 may be referred to as ad candidates 240. In some embodiments, each of the ad candidates 240 may have targeted users 250 (including the user 210), and each ad candidate's targeted users 250 may have been grouped into a number groups 260 according to various grouping strategies. As shown in FIG. 2, the targeted users of Ad_1 are divided into three groups G1, G2, and G3, and the targeted users of Ad_2 are divided into one group G (e.g., all users are in the same group). In order to select one of the two ad candidates 240 to display to the user 210, the computing device 220 may then determine which ad candidate will likely to generate a higher conversion rate when delivered to the user 210. Assuming the user 210 is in G2 corresponding to Ad_1, and is in G corresponding to Ad_2, the computing device 220 may determine a first conversion score corresponding to delivering Ad_1 to the user 210, and a second conversion score corresponding to delivering Ad_2 to the user 210. In some embodiments, the first conversion score may be determined based on various factors, including the user 210's personal conversion rate (e.g., the likely the user will click an ad) and the conversion rate of the group including the user 210 (e.g., G2's conversion rate). In some embodiments, G2's conversion rate may be calculated as the average conversion rate of all the users in the group G2. This average conversion rate may reflect how "attractive" the Ad_1 is to the users in G2 (e.g., how likely a user in G2 will click on the Ad_1). In some embodiments, the second conversion score corresponding to Ad_2 may be calculated in the same way. Subsequently, the ad candidate with the highest conversion score may be selected to be displayed in the ad slot on the webpage 230 for the user 210.

Figure 3:
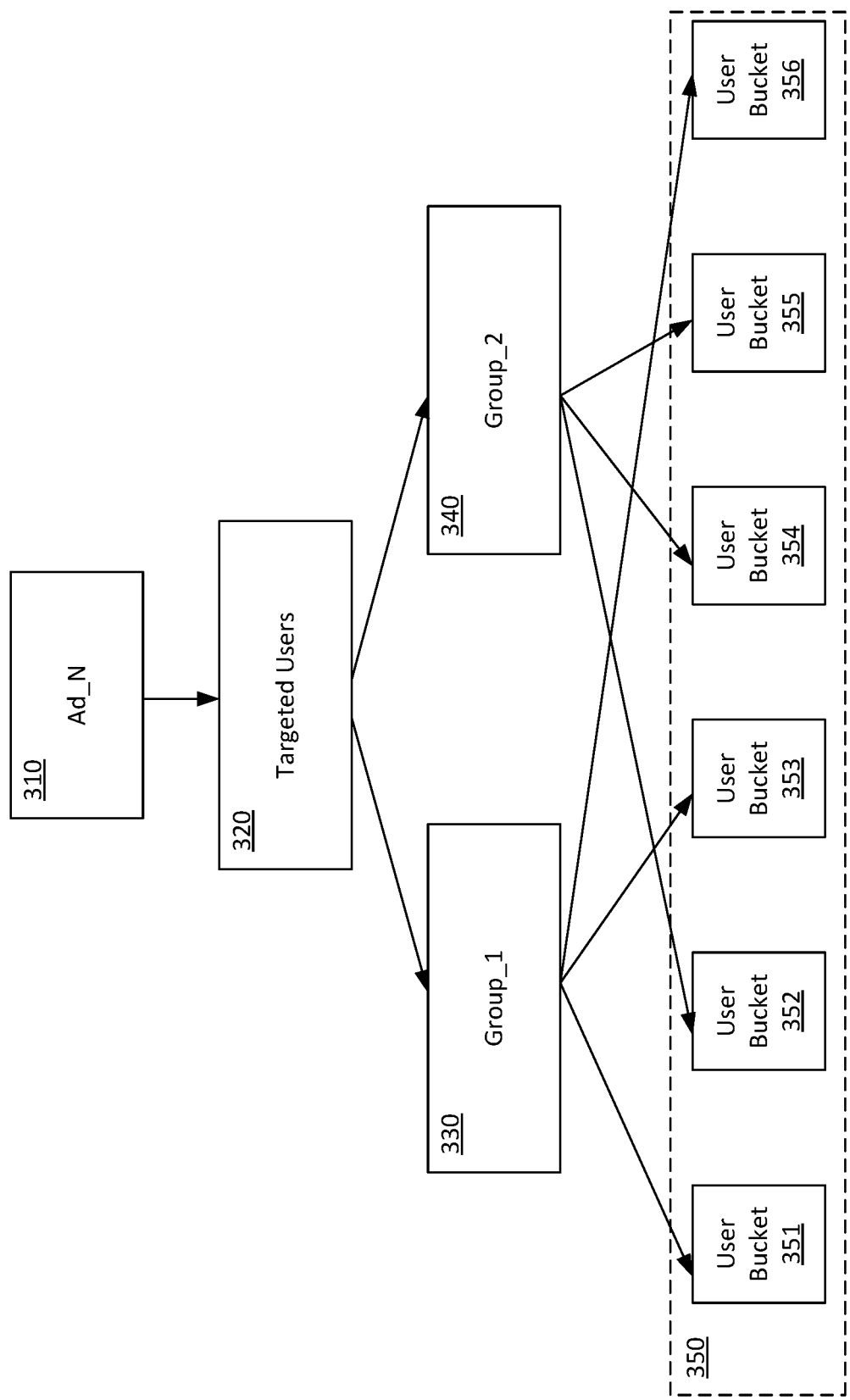
FIG. 3 illustrates an example user grouping flow, in accordance with various embodiments.

FIG. 3 illustrates an example flow for user grouping, in accordance with various embodiments. FIG. 3 uses Ad_N 310 from FIG. 2 as an example to describe how to group Ad_N's targeted users 320. In some embodiments, the number of groups to be created for one ad may be configured by the advertiser, the online marketing platform, or another suitable party. For example, the target users 320 for Ad_N 310 in FIG. 3 is to be divided in to two groups: group_1 330 and group_2 340.

In some embodiments, each of the target users 320 may have a personal conversion rate (or a conversion score). For example, the personal conversion rate may be a floating value between 0% and 100%, where a user with 0% conversion rate will not click any ad, but a user with 100% conversion rate will click every ad. Based on these personal conversion rates, these targeted users 320 may be first divided into a large number of buckets 350. For example, Ad_N has ten million targeted users 320, which may be divided into ten thousands user buckets 350, with the first bucket comprising the users with personal conversion rates between 100% and 99.99%, the second bucket comprising the users with personal conversion rates between 99.99% and 99.98%, and so on. Thus, the users with similar conversion rates are grouped into the same bucket. It may be appreciated that the numbers of users in the user buckets may be different.

In some embodiments, in order to determine an optimal grouping strategy to assign the user buckets 350 into the user groups 330 and 340, a solution to an optimization problem may be determined first. The optimization problem may comprise an objective function that maximizes a global conversion score. For example, the optimization problem may be represented as formula (2) and the corresponding constraint may be represented as formula (3). As mentioned above, the optimization problem may depend on a conversion rate prediction model to predict conversion score based on inputs (e.g., personal conversion rate and group average conversion rate). For example, the conversion rate prediction model may be trained as a logistic function (e.g., formula (1)) based on historical data. In some embodiments, the conversion rate prediction model may be updated periodically. For example, the ads delivery and user responses may be collected on daily (or hourly) basis, and the conversion rate prediction model may be adjusted to fit the newly collected data.

The solution to the optimization problem shown in formula (2) may provide a vector (or a matrix) of binary decision variables. Each decision variable may determine whether a user bucket is assigned to one user group. For example, assuming the decision variables $x_{351,1}=x_{353,1}=x_{356,1}=x_{352,2}=x_{354,2}=x_{355,2}=1$, and all other decision variables are 0s, then the user buckets 351, 353 and 356 may be assigned to group_1 330, while the user buckets 352, 354 and 355 may be assigned to group_2 340.

An example is described below to demonstrate that the user grouping method disclosed herein may achieve a higher global conversion score than the existing solution (e.g., users are assigned into groups solely based on their personal conversion rates).

First, the logistic function in formula (1) may be assumed as already trained by fitting the historical data collected in response to one ad, and represented as formula (4).

$$f(v_1, v_2) = \frac{1}{1 + e^{-v_1 - v_2}} \quad (4)$$

where $v_1$ represents a first conversion score associated with a user (or a user bucket), and $v_2$ represents a second conversion score associated with one or more users (e.g., a group of users, or a group of user buckets) that include the user. In formula (4), a larger $v_1$ (e.g., a higher personal conversion rate) or a larger $v_2$ (e.g., a higher group average conversion rate) may lead to a higher f (e.g., an overall exposure rate).

Second, assuming the ad has four targeted users: A, B, C, and D, with corresponding personal conversion rates as 100%, 90%, 2%, and 1%. According to the existing user grouping methods, A and B may be grouped together, C and D may be grouped together. However, the user grouping method disclosed herein may group A and D together, B and C together. The comparison of two grouping methods are shown in the Table 1.

TABLE 1

Comparison of existing solution and solution disclosed herein

| Solution | | Group 1 | Group 2 |
|---|---|---|---|
| Existing solution | Members | A(100%) B (90%) | C (2%) D (1%) |
| | Group Average Conversion rate | 95% | 1.5% |
| Solution disclosed herein | Members | A(100%) D (1%) | B (90%) C (2%) |
| | Group Average Conversion rate | 50.5% | 46% |

According to the optimization function in formula (2) and the trained logistic function in formula (4), the global conversion score of the existing solution provides f(100%, 95%)*2+f(90%, 95%)*2+f(2%, 1.5%)*2+f(1%, 1.5%)*2=5.509, while the global conversion score of the solution disclosed herein provides f(100%, 50.5%)*2+f(1%, 50.5%)*2+f(90%, 46%)*2+f(2%, 46%)*2=5.715, which may be a better user grouping strategy.

Figure 4:
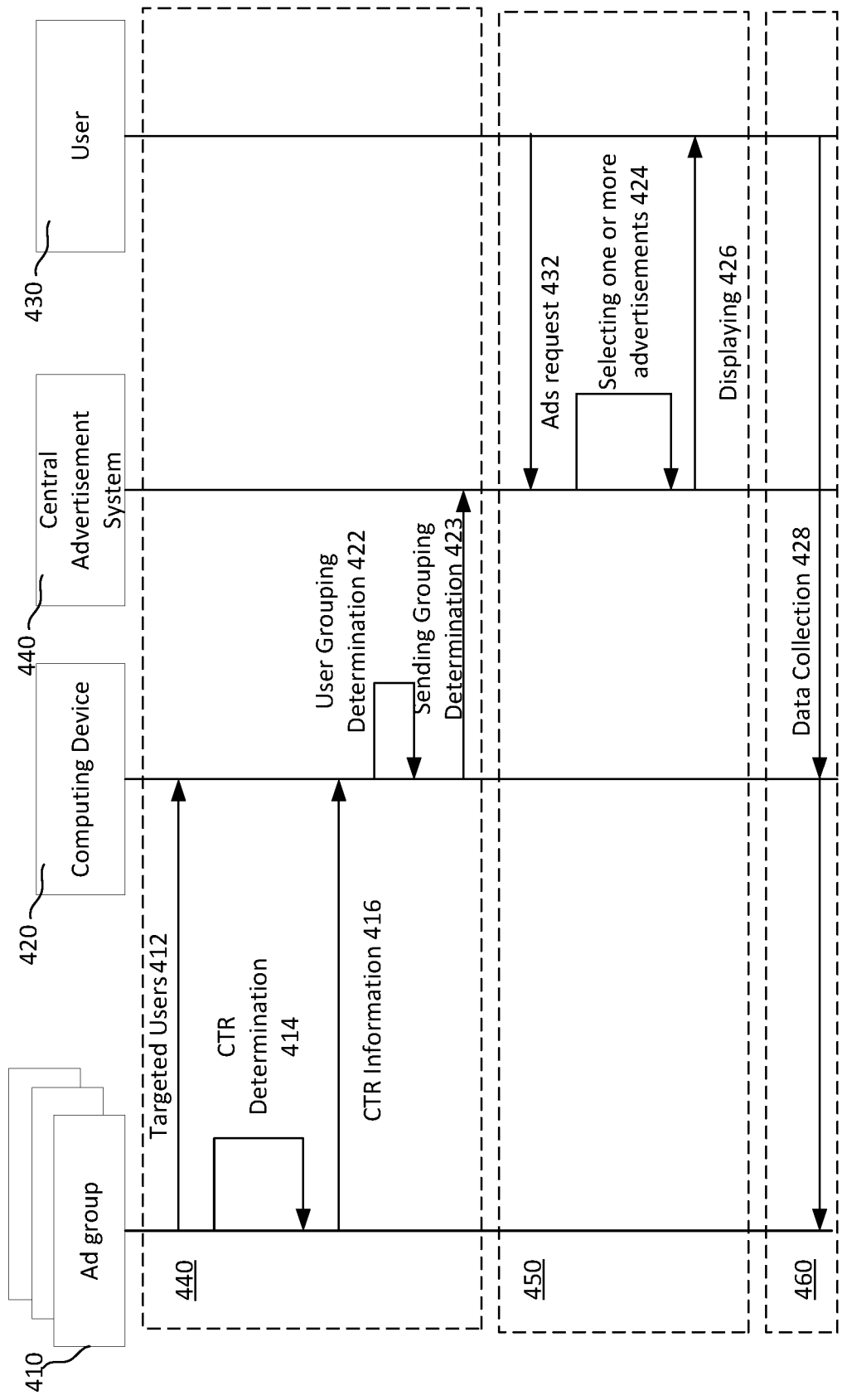
FIG. 4 illustrates a method for determining advertisements to be displayed to a user, in accordance with various embodiments.

FIG. 4 illustrates an example method for determining advertisements to be displayed to a user, in accordance with various embodiments. The example method may include several phases. For example, the steps in 440 in FIG. 4 may refer to a preparation phase, the steps in 450 in FIG. 4 may refer to a serving phase, and the steps in 460 in FIG. 4 may refer to a data collection phase. In some embodiments, these phases may be executed in different orders, or in parallel. In some embodiments, the method may include alternative or more phases.

As shown in FIG. 4, a device (or a group of devices) hosting one or more ad groups 410 (e.g., each ad group may include one or more advertisements targeting similar users) may send data to a computing device 420 (e.g., a computing device associated with the host of a webpage, an application server, etc.). In some embodiments, each ad group 410 may have targeted users. For example, baby formula advertisements may mainly target new parents, but may less likely target teenagers. The device hosting an ad group 410 may send information (e.g., identification information, categorical information) about the targeted users 412 to the computing device 420 for it to identify such targeted users. In some embodiments, the ad group 410 may also perform click-through rate (CTR) determination 414 to obtain individual users' personal CTR rates. For example, the ad group 410 may deliver its ads to a group of users through sampling (e.g., a group of people with diverse features), and measure the CTR rates of different types of users. In some embodiments, the ad group 410 may send such CTR information 416 to the computing device 420. In other embodiments, individual user's personal CTR rates (or other conversion rate metrics) may be learned or collected by the computing device 420, or obtained through other suitable means (e.g., through a third party).

In some embodiments, after obtaining the information of the targeted users and corresponding personal CTR rates, a CTR prediction model may be built based on historical data. This model may be built by the ad group 410, the computing device 420, or another suitable party. In some embodiments, the CTR prediction model may be a logistic function that takes in two input parameters: an individual conversion rate, and a group average conversion rate. The individual conversion rate may refer to an individual user's conversion rate, or a small group (e.g., a bucket) of users' average conversion rate. The group average conversion rate may refer to the average conversion rate of all the users in a user group (e.g., usually much larger than a user bucket). The individual conversion rate may represent how likely an individual will click the ad, while the group average conversion rate may represent a subjective "quality" of the specific advertisement (e.g., each user's conversion rate may be treated as a rating for the ad's quality, and the average rating may reflect the "attractiveness" of the ad to the users in the group).

In some embodiments, with the CTR prediction model, the computing device 420 may perform user grouping determination 422 by formulating an optimization problem. The objective function of the optimization problem may be to maximize a total conversion score (e.g., overall exposure rate), and the decision variables of the optimization problem may provide an optimal user grouping strategy.

Subsequently, at step 423, the optimal user grouping strategy may be sent to the central advertisement system 440 who determines ads deliveries. In some embodiments, the central advertisement system 440 may be a black box system separated from the computing device 420. In other embodiments, the central advertisement system 440 may be integrated into the computing device 420.

In some embodiments, when a user 430 opens a webpage, an application, or another online interface that allows ads to be displayed, the central advertisement system 440 automatically detect an ads request at step 432. The central advertisement system 440 may select, from the advertisement candidates, a few ads at step 424 and deliver them to the user at step 426. For example, the central advertisement system 440 may first determine a plurality of ads targeting this user. For each of these ads, the central advertisement system 440 may then determine the individual conversion rate associated with the user, and the group average conversion rate associated with the user group comprising the user. Based on these two conversion rates, the central advertisement system 440 may calculate an overall score corresponding to delivering the specific ad to the specific user. The central advertisement system 440 may conduct the same operations for the other ad groups that target the users (e.g., in parallel), and then select the ones with the highest total conversion scores (e.g., the highest overall exposure rates) to deliver to the user. In some embodiments, these selected ads are automatically delivered to the user 430 when the user 430 opens an application or a web browser on a computing device (e.g., a computer 140a or a mobile device 140b in FIG. 1). For example, these selected ads may be displayed in a banner (e.g., a section containing ads slots) on the webpage or the first page of the application. Here, the "automatic" delivery implies that the central advertisement system 440 may automatically detect that the user has opened an interface (e.g., webpage, application) with ads slots for ads displaying, and automatically deliver the selected ads and display them in the corresponding ads slots to the user.

In some embodiments, the user's reaction to the delivered ads may be collected 428 as historical data. The historical data collected in a predetermined time period may be used to update the CTR prediction model. In some embodiments, each user's CTR or another conversion rate metric corresponding to one ad may also be updated periodically. In some embodiments, the predetermined time period may be fixed or flexible. For example, during shopping slow seasons, this time period may be set to "daily," while during holiday season, this time period may be smaller (e.g., every three hours) so that the prediction model is more up-to-date and the user grouping is more responsive.

Figure 5:
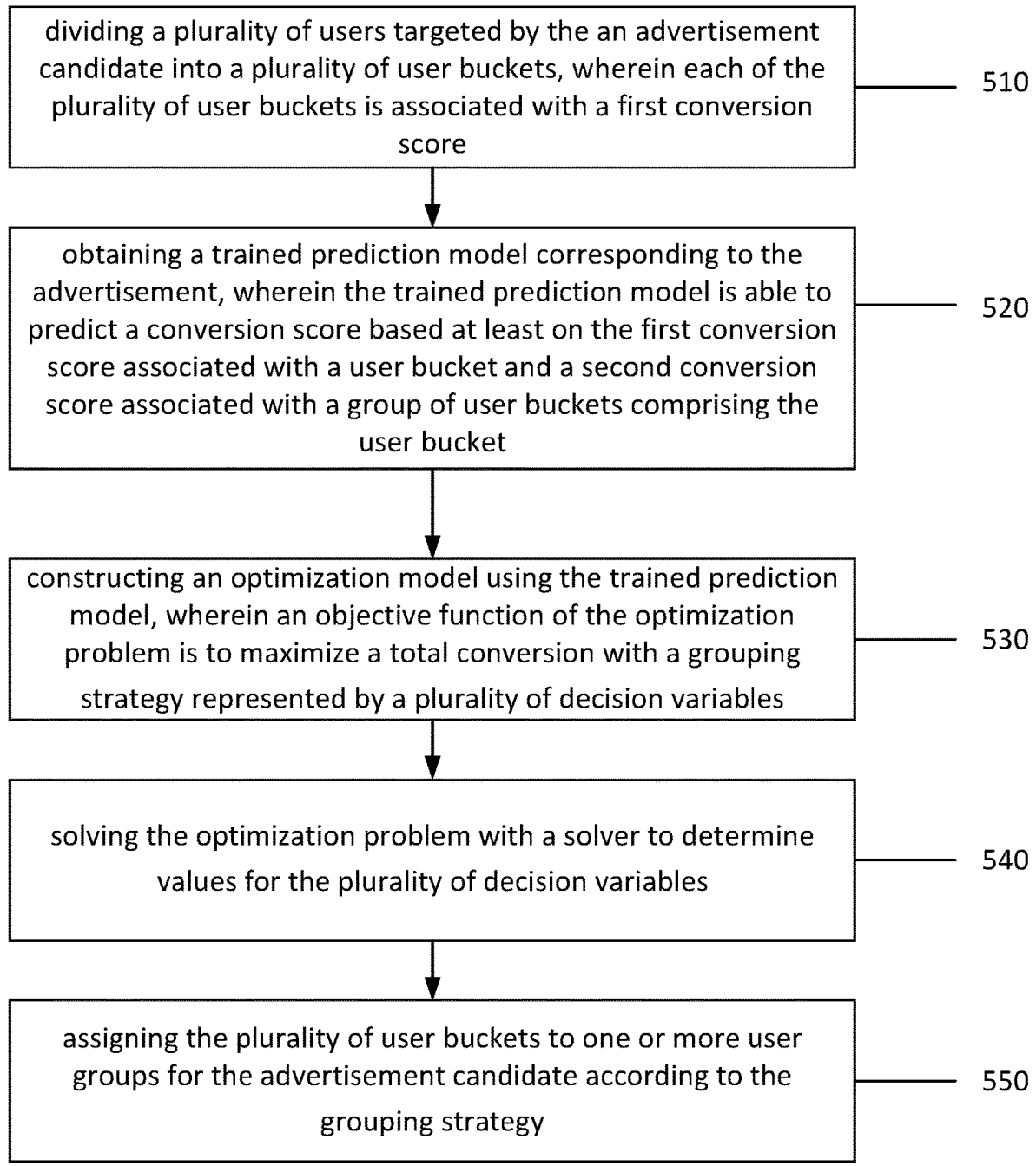
FIG. 5 illustrates an example method for grouping users, in accordance with various embodiments.

FIG. 5 illustrates an example method for grouping users, in accordance with various embodiments. The method 500 may be performed by a device, apparatus, or system for personalizing offers for users. The method 500 may be performed by one or more components of the environment or system illustrated by FIGS. 1-4, such as the computing system 102, and the computing device 220. Depending on the implementation, the method 500 may include additional, fewer, or alternative steps performed in various orders or in parallel.

Block 510 includes dividing a plurality of users targeted by the an advertisement candidate into a plurality of user buckets, wherein each of the plurality of user buckets is associated with a first conversion score.

Block 520 includes obtaining a trained prediction model corresponding to the advertisement, wherein the trained prediction model is able to predict a conversion score based at least on the first conversion score associated with a user bucket and a second conversion score associated with a group of user buckets comprising the user bucket. In some embodiments, each of the plurality of users is associated with a third conversion score corresponding to the advertisement; each of the plurality of user buckets comprises one or more of the plurality of users; and the first conversion score associated with the each of the plurality of user buckets comprises an average of one or more third conversion scores associated with the one or more of the plurality of users in the each of the plurality of user buckets. In some embodiments, the third conversion score is a click through rate in response to the advertisement. In some embodiments, the second conversion score associated with a group of one or more of the plurality of user buckets is determined based at least on the first conversion scores associated with the one or more of the plurality of user buckets in the group and a number of users in each of the one or more of the plurality of user buckets.

Block 530 includes constructing an optimization model using the trained prediction model, wherein an objective function of the optimization problem is to maximize a total conversion with a grouping strategy represented by a plurality of decision variables. In some embodiments, the prediction model is a tensor flow model that fits historical data of exposure rate to estimate a plurality of parameters of a logistic function. In some embodiments, the optimization model comprises a constraint that one user bucket is assigned to one and only one user group. In some embodiments, the objective function of the optimization problem is max $\Sigma_{j=1}^{J} \Sigma_{i=1}^{I} f(s_i, t_j) * n_i * x_{ij}$; where J is the quantity of the one or more user groups; where j corresponds to $j_{th}$ user group; where I is a number of the plurality of user buckets; where i corresponds to $i_{th}$ user bucket; where $f(s_i, t_j)$ corresponds to the trained prediction model; where $s_i$ corresponds to the first conversion score of the $i_{th}$ user bucket; where $t_j$ corresponds to the second conversion score of the $j_{th}$ user group; where $n_i$ corresponds to a number of users in the $i_{th}$ user bucket; and where $x_{ij}$ corresponds to a decision variable indicating whether the $i_{th}$ user bucket is assigned to the $j_{th}$ user group.

Block 540 includes solving the optimization problem with a solver (e.g., open source or commercial programs to solve optimization problems) to determine values of the plurality of decision variables. In some embodiments, the values of the plurality of decision variables are binary values; and each of the plurality of decision variables represents whether one of the plurality of user buckets is assigned to one of the one or more user groups.

Block 550 includes assigning the plurality of user buckets to one or more user groups for the advertisement candidate according to the grouping strategy. In some embodiments, a quantity of the one or more user groups is a configurable value associated with the advertisement.

In some embodiments, the method 500 may further comprise identifying a plurality of the advertisement candidates targeting a user; for each of the plurality of the advertisement candidates, determining a score for delivering the each advertisement candidate to the user, wherein the score is determined based at least on the grouping strategy; identifying one or more of the plurality of advertisement candidates based at least on one or more corresponding scores; and automatically delivering the one or more advertisement candidates to a computing device associated with the user to cause the one or more advertisement candidates to be displayed on the computing device.

In some embodiments, the determining a score for delivering the each advertisement candidate may comprise: determining the score based at least on the first conversion score associated with one of the plurality of user buckets comprising the user, and the second conversion score associated with one of the one or more user groups comprising the one user bucket.

In some embodiments, the identifying one or more of the plurality of advertisements may comprise: identifying the one or more advertisement candidates with the highest scores.

Figure 6:
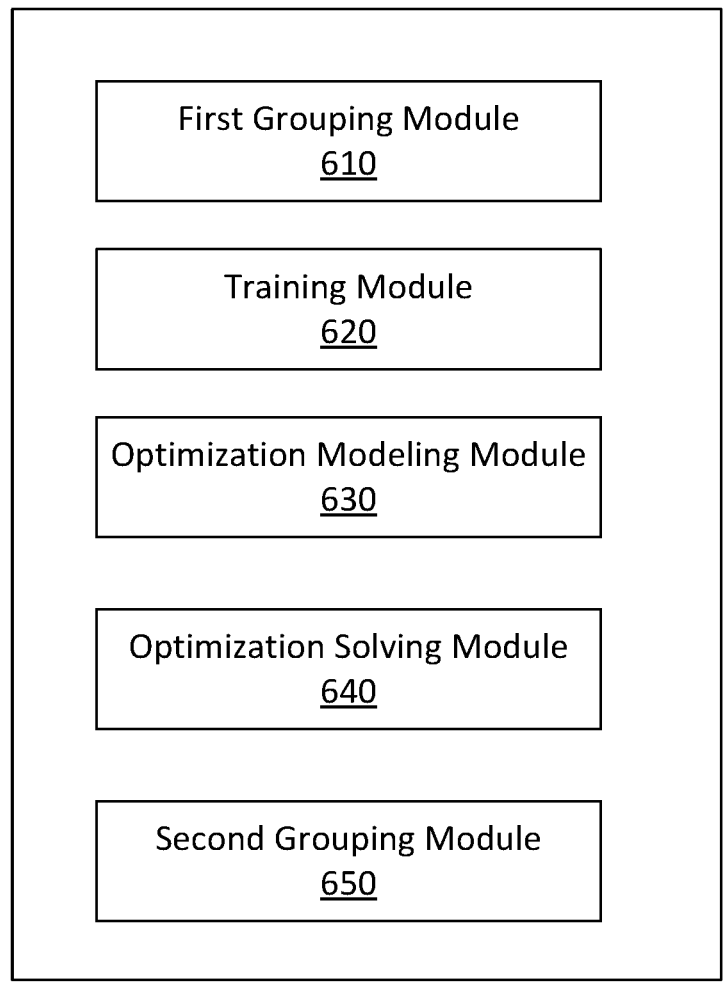
FIG. 6 illustrates a block diagram of a computer system apparatus for optimizing user grouping for advertisement in accordance with some embodiments.

FIG. 6 illustrates a block diagram of a computer system 600 apparatus for optimizing user grouping for advertisement in accordance with some embodiments. The components of the computer system 600 presented below are intended to be illustrative. Depending on the implementation, the computer system 600 may include additional, fewer, or alternative components.

The computer system 600 may be an example of an implementation of one or more components of the computing system 102. The flows and method illustrated in FIGS. 2-5 may be implemented by the computer system 600. The computer system 600 may comprise one or more processors and one or more non-transitory computer-readable storage media (e.g., one or more memories) coupled to the one or more processors and configured with instructions executable by the one or more processors to cause the system or device (e.g., the processor) to perform the above-described method, e.g., the method 500. The computer system 600 may comprise various units/modules corresponding to the instructions (e.g., software instructions).

In some embodiments, the computer system 600 may be referred to as an apparatus for optimizing user grouping for advertisement. The apparatus may comprise a first grouping module 610, a training module 620, an optimization modeling module 630, an optimization solving module, and a second grouping module 650. In some embodiments, the first grouping module 610 may divide a plurality of users targeted by the an advertisement candidate into a plurality of user buckets, wherein each of the plurality of user buckets is associated with a first conversion score; the training module 620 may obtain a trained prediction model corresponding to the advertisement, wherein the trained prediction model is able to predict a conversion score based at least on the first conversion score associated with a user bucket and a second conversion score associated with a group of user buckets comprising the user bucket; the optimization modeling module 630 may construct an optimization model using the trained prediction model, wherein an objective function of the optimization problem is to maximize a total conversion score with a grouping strategy represented by a plurality of decision variables; the optimization solving module 640 may solve the optimization problem to determine values of the plurality of decision variables; and the second grouping module 650 may assign the plurality of user buckets to one or more user groups for the advertisement candidate according to the grouping strategy.

Figure 7:
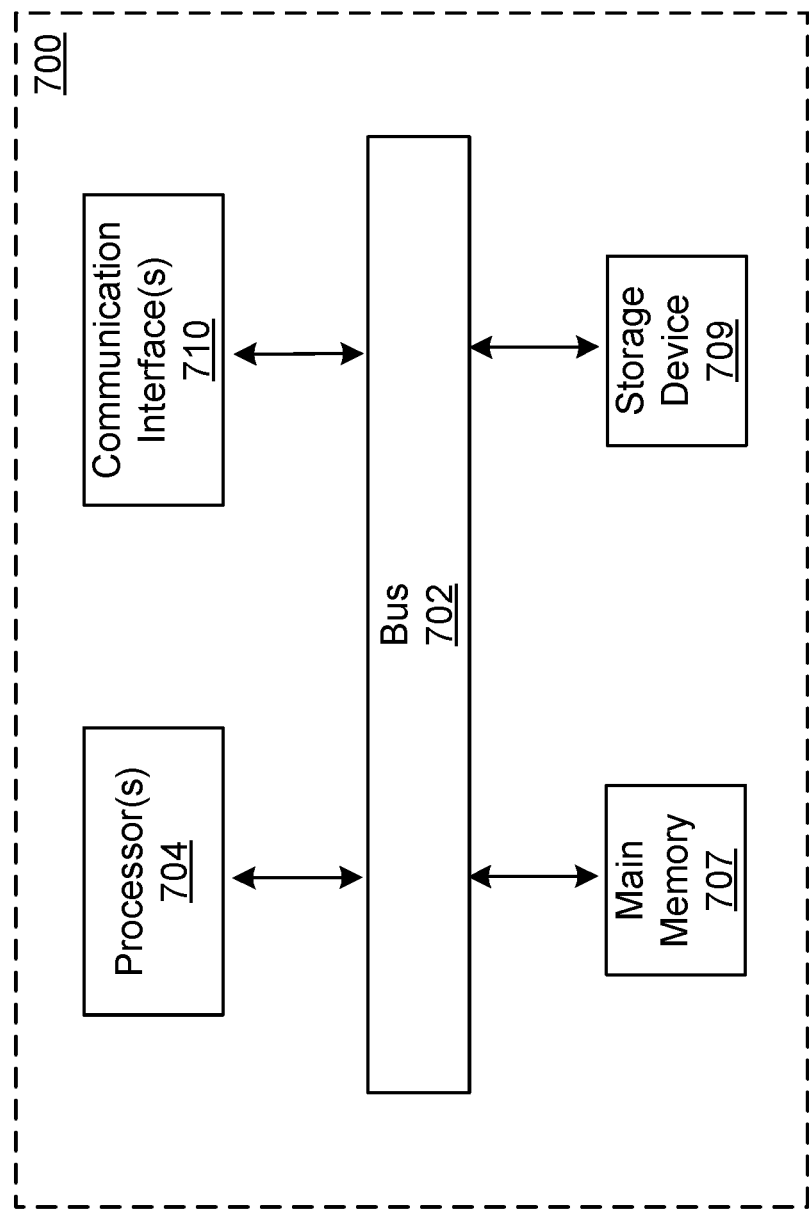
FIG. 7 illustrates an example computing device in which any of the embodiments described herein may be implemented.

FIG. 7 illustrates an example computing device in which any of the embodiments described herein may be implemented. The computing device may be used to implement one or more components of the systems and the methods shown in FIGS. 1-6. The computing device 700 may comprise a bus 702 or other communication mechanism for communicating information and one or more hardware processors 704 coupled with bus 702 for processing information. Hardware processor(s) 704 may be, for example, one or more general purpose microprocessors.

The computing device 700 may also include a main memory 707, such as a random-access memory (RAM), cache and/or other dynamic storage devices, coupled to bus 702 for storing information and instructions to be executed by processor(s) 704. Main memory 707 also may be used for storing temporary variables or other intermediate information during execution of instructions to be executed by processor(s) 704. Such instructions, when stored in storage media accessible to processor(s) 704, may render computing device 700 into a special-purpose machine that is customized to perform the operations specified in the instructions. Main memory 707 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 700 may implement the techniques described herein using customized hard-wired logic, one or more ASICs or FPGAs, firmware and/or program logic which in combination with the computing device may cause or program computing device 700 to be a special-purpose machine. According to one embodiment, the techniques herein are performed by computing device 700 in response to processor(s) 704 executing one or more sequences of one or more instructions contained in main memory 707. Such instructions may be read into main memory 707 from another storage medium, such as storage device 709. Execution of the sequences of instructions contained in main memory 707 may cause processor(s) 704 to perform the process steps described herein. For example, the processes/methods disclosed herein may be implemented by computer program instructions stored in main memory 707. When these instructions are executed by processor(s) 704, they may perform the steps as shown in corresponding figures and described above. In alternative embodiments, hard-wired circuitry may be used in place of or in combination with software instructions.

The computing device 700 also includes a communication interface 710 coupled to bus 702. Communication interface 710 may provide a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method for grouping users, comprising:
    obtaining a plurality of users targeted by the an advertisement candidate, wherein each of the plurality of users is associated with an individual conversion rate representing a likelihood of the user clicking on an advertisement via an online interface;
    obtaining a tensorflow model corresponding to the advertisement candidate trained based on historical data, wherein the tensorflow model is trained by fitting the historical data into a logistic function to predict a conversion score of a given user for delivering the advertisement candidate to the given user based at least on the following two parameters:
        the individual conversion rate associated with the given user, and
        an average conversion rate of a group of users selected from the plurality of users, based on a given grouping strategy, the group of users comprising the given user;
    constructing and solving an optimization model using the trained tensorflow model to determine an optimal grouping strategy, wherein an objective function of the optimization model is to maximize a sum of the conversion scores predicted by the trained tensorflow model for delivering the advertisement candidate to the plurality of users based on the optimal grouping strategy;
    dividing the plurality of users into a plurality of optimal groups based on the optimal grouping strategy; and
    sending the plurality of optimal groups to an advertisement system for determining whether to select the advertisement candidate from a plurality of advertisement candidates for delivering to an online user, wherein the plurality of advertisement candidates target the online user, and respectively correspond to a plurality of trained tensorflow models for predicting conversion scores and optimal grouping strategies determined using the plurality of trained tensorflow models.

2. The computer-implemented method of claim 1, wherein the determining whether to deliver the advertisement candidate to the online user comprises:
    for each of the plurality of advertisement candidates, determining a score for delivering the each advertisement candidate to the online user, wherein the score is determined based at least on the individual conversion rate of the online user and the average conversion rate of an optimal group comprising the online user;
    identifying one of the plurality of advertisement candidates with a highest score; and
    automatically delivering the advertisement candidate with the highest score to a computing device associated with the online user to cause the advertisement candidate with the highest score to be displayed on the computing device.

3. The computer-implemented method of claim 1, wherein:
    the individual conversion rate is a click through rate.

4. The method of claim 1, wherein:
    the average conversion rate is determined based at least on (i) the individual conversion rates associated with the group of users and (ii) a number of users in the group of users.

5. The computer-implemented method of claim 1, wherein:
    the optimal grouping strategy is represented by a plurality of decision variables of the optimization model;
    values of the plurality of decision variables are binary values; and
    each of the plurality of decision variables represents whether one of the plurality of users is assigned to one of a plurality of optimal user groups.

6. The computer-implemented method of claim 5, wherein:
    a quantity of the plurality of optimal user groups is a configurable value associated with the advertisement.

7. The computer-implemented method of claim 1, wherein:
    the optimization model comprises a constraint that one user is assigned to one and only one user group.

8. The computer-implemented method of claim 1, wherein:
    the objective function of the optimization problem is max $\Sigma_{j=1}^{J}\Sigma_{i=1}^{I} f(s_i, t_j) * x_{ij}$;
    where J is a quantity of a plurality of user groups;
    where j corresponds to a $j_{th}$ user group;
    where I is a number of the plurality of users;
    where i corresponds to a $i_{th}$ user;
    where $f(s_i, t_j)$ corresponds to the trained tensorflow model;
    where $s_i$ corresponds to the individual conversion rate of the $i_{th}$ user;
    where $t_j$ corresponds to the average conversion rate of the $j_{th}$ user group; and
    where $x_{ij}$ corresponds to a decision variable indicating whether the $i_{th}$ user is assigned to the $j_{th}$ user group.

9. A system for grouping users, comprising one or more processors and one or more non-transitory computer-readable memories coupled to the one or more processors and configured with instructions executable by the one or more processors to cause the system to perform operations comprising:
    obtaining a plurality of users targeted by the an advertisement candidate, wherein each of the plurality of users is associated with an individual conversion rate representing a likelihood of the user clicking on an advertisement via an online interface;

obtaining a tensorflow model corresponding to the advertisement candidate trained based on historical data, wherein the tensorflow model is trained by fitting the historical data into a logistic function to predict a conversion score of a given user for delivering the advertisement candidate to the given user based at least on the following two parameters:

the individual conversion rate associated with the given user, and an average conversion rate of a group of users selected from the plurality of users, based on a given grouping strategy, the group of users comprising the given user;

constructing and solving an optimization model using the trained tensorflow model to determine an optimal grouping strategy, wherein an objective function of the optimization model is to maximize a sum of the conversion scores predicted by the trained tensorflow model for delivering the advertisement candidate to the plurality of users based on the optimal grouping strategy;

dividing the plurality of users into a plurality of optimal groups based on the optimal grouping strategy; and sending the plurality of optimal groups to an advertisement system for determining whether to select the advertisement candidate from a plurality of advertisement candidates for delivering to an online user, wherein the plurality of advertisement candidates target the online user, and respectively correspond to a plurality of trained tensorflow models for predicting conversion scores and optimal grouping strategies determined using the plurality of trained tensorflow models.

10. The system of claim 9, wherein the determining whether to deliver the advertisement candidate to the online user comprises:

for each of the plurality of advertisement candidates, determining a score for delivering the each advertisement candidate to the online user, wherein the score is determined based at least on the optimal grouping strategy;

identifying one of the plurality of advertisement candidates with a highest score; and automatically delivering the one advertisement candidate to a computing device associated with the online user to cause the one advertisement candidate to be displayed on the computing device.

11. A non-transitory computer-readable storage medium configured with instructions executable by one or more processors to cause the one or more processors to perform operations comprising:

obtaining a plurality of users targeted by the an advertisement candidate, wherein each of the plurality of users is associated with an individual conversion rate representing a likelihood of the user clicking on an advertisement via an online interface;

obtaining a tensorflow model corresponding to the advertisement candidate trained based on historical data, wherein the tensorflow model is trained by fitting the historical data into a logistic function to predict a conversion score of a given user for delivering the advertisement candidate to the given user based at least on the following two parameters:

the individual conversion rate associated with the given user, and an average conversion rate of a group of users selected from the plurality of users, based on a given grouping strategy, the group of users comprising the given user;

constructing and solving an optimization model using the trained tensorflow model to determine an optimal grouping strategy, wherein an objective function of the optimization model is to maximize a sum of the conversion scores predicted by the trained tensorflow model for delivering the advertisement candidate to the plurality of users based on the optimal grouping strategy;

dividing the plurality of users into a plurality of optimal groups based on the optimal grouping strategy; and sending the plurality of optimal groups to an advertisement system for determining whether to select the advertisement candidate from a plurality of advertisement candidates for delivering to an online user, wherein the plurality of advertisement candidates target the online user, and respectively correspond to a plurality of trained tensorflow models for predicting conversion scores and optimal grouping strategies determined using the plurality of trained tensorflow models.

12. The non-transitory computer-readable storage medium of claim 11, wherein the determining whether to deliver the advertisement candidate to the online user comprises:

for each of the plurality of advertisement candidates, determining a score for delivering the each advertisement candidate to the online user, wherein the score is determined based at least on the optimal grouping strategy;

identifying one of the plurality of advertisement candidates with a highest score; and automatically delivering the one advertisement candidate to a computing device associated with the online user to cause the one advertisement candidate to be displayed on the computing device.

13. The system of claim 9, wherein:
the individual conversion rate is a click through rate.

14. The system of claim 9, wherein:
the average conversion rate is determined based at least on (i) the individual conversion rates associated with the group of users and (ii) a number of users in the group of users.

15. The system of claim 9, wherein the optimal grouping strategy is represented by a plurality of decision variables of the optimization model;

values of the plurality of decision variables are binary values; and each of the plurality of decision variables represents whether one of the plurality of users is assigned to one of a plurality of optimal user groups.

16. The system of claim 9, wherein:
the optimization model comprises a constraint that one user is assigned to one and only one user group.

17. The non-transitory computer-readable storage medium of claim 11, wherein:
the individual conversion rate is a click through rate.

18. The non-transitory computer-readable storage medium of claim 11, wherein:
the average conversion rate is determined based at least on (i) the individual conversion rates associated with the group of users and (ii) a number of users in the group of users.

19. The non-transitory computer-readable storage medium of claim 11, wherein:

the optimal grouping strategy is represented by a plurality of decision variables of the optimization model;

values of the plurality of decision variables are binary values; and each of the plurality of decision variables represents whether one of the plurality of users is assigned to one of a plurality of optimal user groups.

20. The non-transitory computer-readable storage medium of claim 11, wherein the optimization model comprises a constraint that one user is assigned to one and only one user group.

* * * * *